United States Patent [19]
Brenner et al.

[11] Patent Number: 5,806,238
[45] Date of Patent: Sep. 15, 1998

[54] BIOLOGICAL VACUUM DEVICE TO ENHANCE ENVIRONMENTAL QUALITY

[75] Inventors: Richard J. Brenner, Gainesville; David E. Milne, High Springs, both of Fla.; Stoy A. Hedges, Memphis, Tenn.

[73] Assignee: The United States of America as represented by the Secretary of the Agriculture, Washington, D.C.

[21] Appl. No.: 712,827

[22] Filed: Sep. 12, 1996

[51] Int. Cl.$^6$ .............................. A01M 1/06; A47L 5/00
[52] U.S. Cl. .............................. 43/139; 15/339; 15/344; 15/345
[58] Field of Search .................. 43/139, 138, 132.1; 15/344, 345, 346, 319, 339

[56] References Cited

U.S. PATENT DOCUMENTS

| | | | |
|---|---|---|---|
| 3,083,396 | 4/1963 | Senne et al. | 15/319 |
| 3,566,921 | 3/1971 | Bell et al. | 15/339 |
| 3,774,262 | 11/1973 | Anthony et al. | 15/345 |
| 3,997,484 | 12/1976 | Weaver et al. | 260/17.4 GC |
| 4,052,765 | 10/1977 | Guhne et al. | 15/344 |
| 4,175,352 | 11/1979 | Catlett | 43/139 |
| 4,302,225 | 11/1981 | Eckart et al. | 15/344 |
| 4,488,331 | 12/1984 | Ward | 43/139 |
| 4,630,329 | 12/1986 | Shores | 43/139 |
| 4,780,986 | 11/1988 | Broomfield et al. | 43/139 |
| 4,918,857 | 4/1990 | Wade et al. | 43/139 |
| 5,018,238 | 5/1991 | Nelle | 15/339 |
| 5,115,765 | 5/1992 | El Omary | 43/139 |
| 5,323,483 | 6/1994 | Baeg | 15/319 |
| 5,367,821 | 11/1994 | Ott | 43/139 |
| 5,400,543 | 3/1995 | Ideker, Jr. | 43/139 |
| 5,477,585 | 12/1995 | Hentzschel et al. | 15/345 |
| 5,495,636 | 3/1996 | Dekker et al. | 15/339 |
| 5,507,067 | 4/1996 | Hoekstra et al. | 15/319 |

OTHER PUBLICATIONS

Hedges, Stoy, "Entomo–LOGICAl Solutions", PCT Magazine, Jul. 1995.
Cohen, S. "A Collection and Marking System Suitable for Epidemiological Studies on Whitefly–Borne Viruses", *Plant Disease*, vol. 73(9), pp. 765–768 (Sep. 1989).
Sauflex, G., "A Rapid Method of Collecting Lipidopterous Larvae", *J. Econ. Ent.*, vo. 66(3), pp. 818–819 (Jun. 1973).
Hedges, S. "IPM–21st Century Pest Management", IN *People Needing People*, 1995 Convention Workbook, 62nd Annual Convention and Exposition (Oct. 1995).
Clinch, P. "A Battery–operated Vacuum Device for Collecting Insects Unharmed", *New Zealand Entomologist*, vol. 5(1), pp. 28–30 (1971).

*Primary Examiner*—Charles T. Jordan
*Assistant Examiner*—Theresa M. Wesson
*Attorney, Agent, or Firm*—M. Howard Silverstein; John Fado; Gail E. Poulos

[57] ABSTRACT

A vacuum device having a hand-held intake and collection unit and a hand-held heater/air exhaust tube assembly is used to chase and collect pests, such as insects, and their associated allergens from their harborages. The device has a system of filter assemblies which remove contaminants from the air and exhausts clean air back into the surrounding environment.

20 Claims, 9 Drawing Sheets

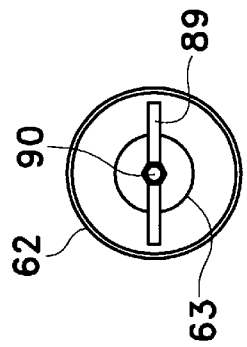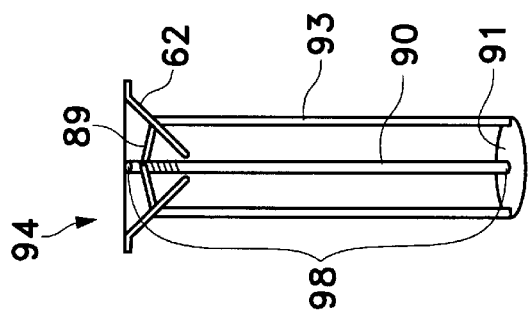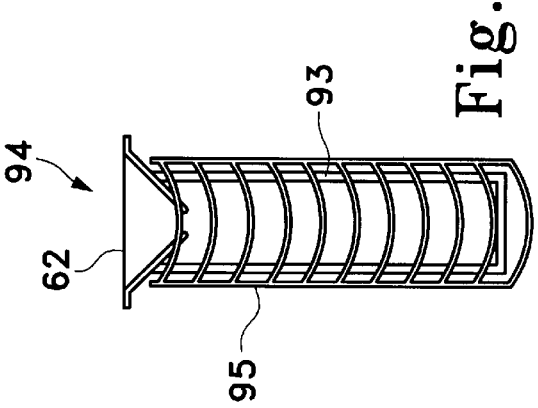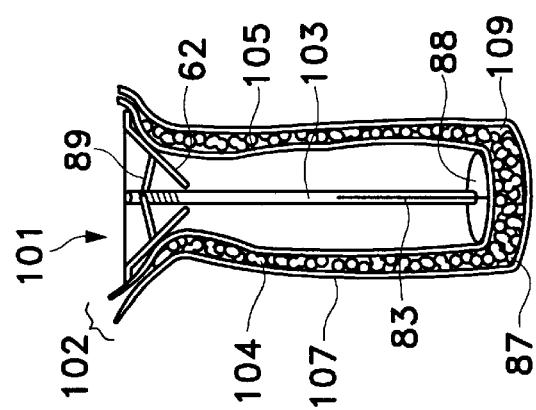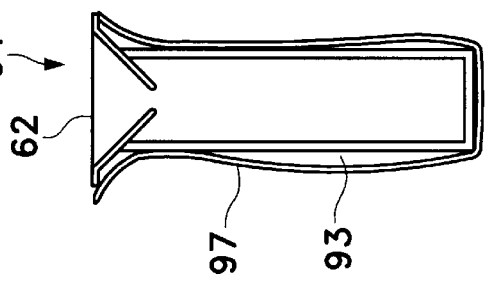

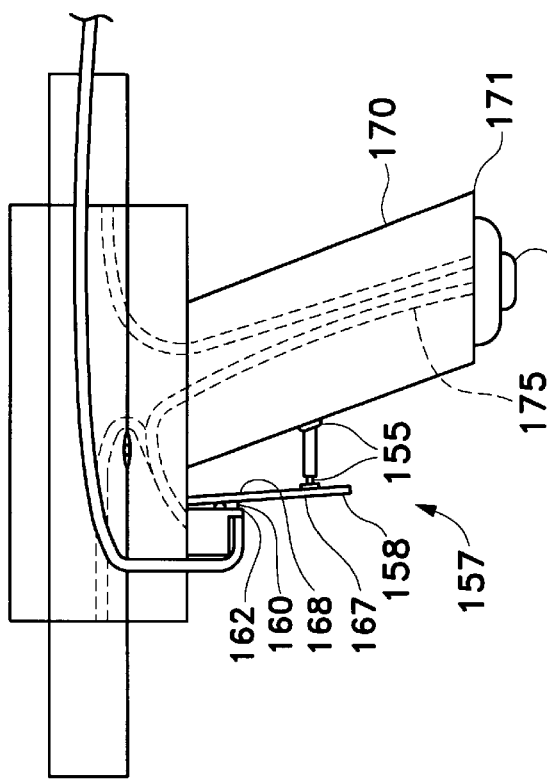
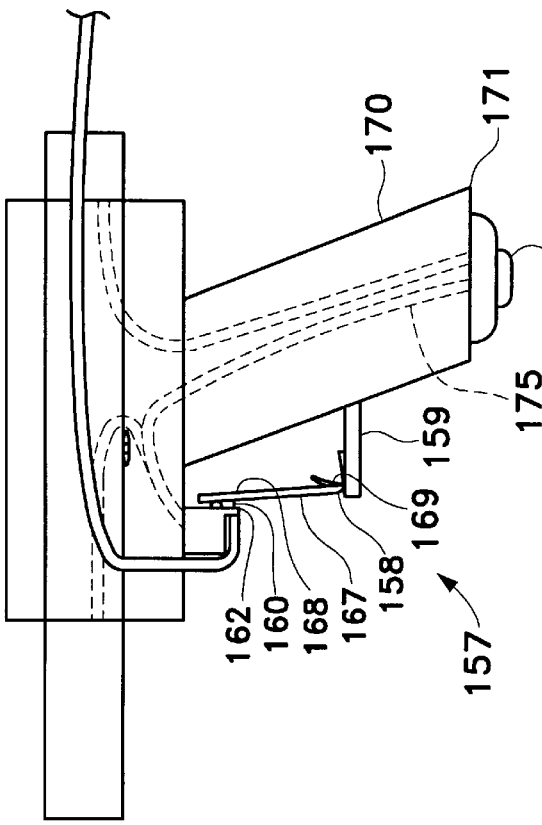
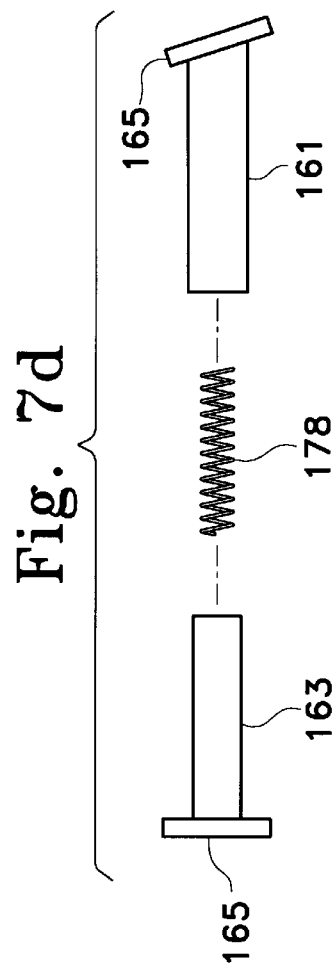

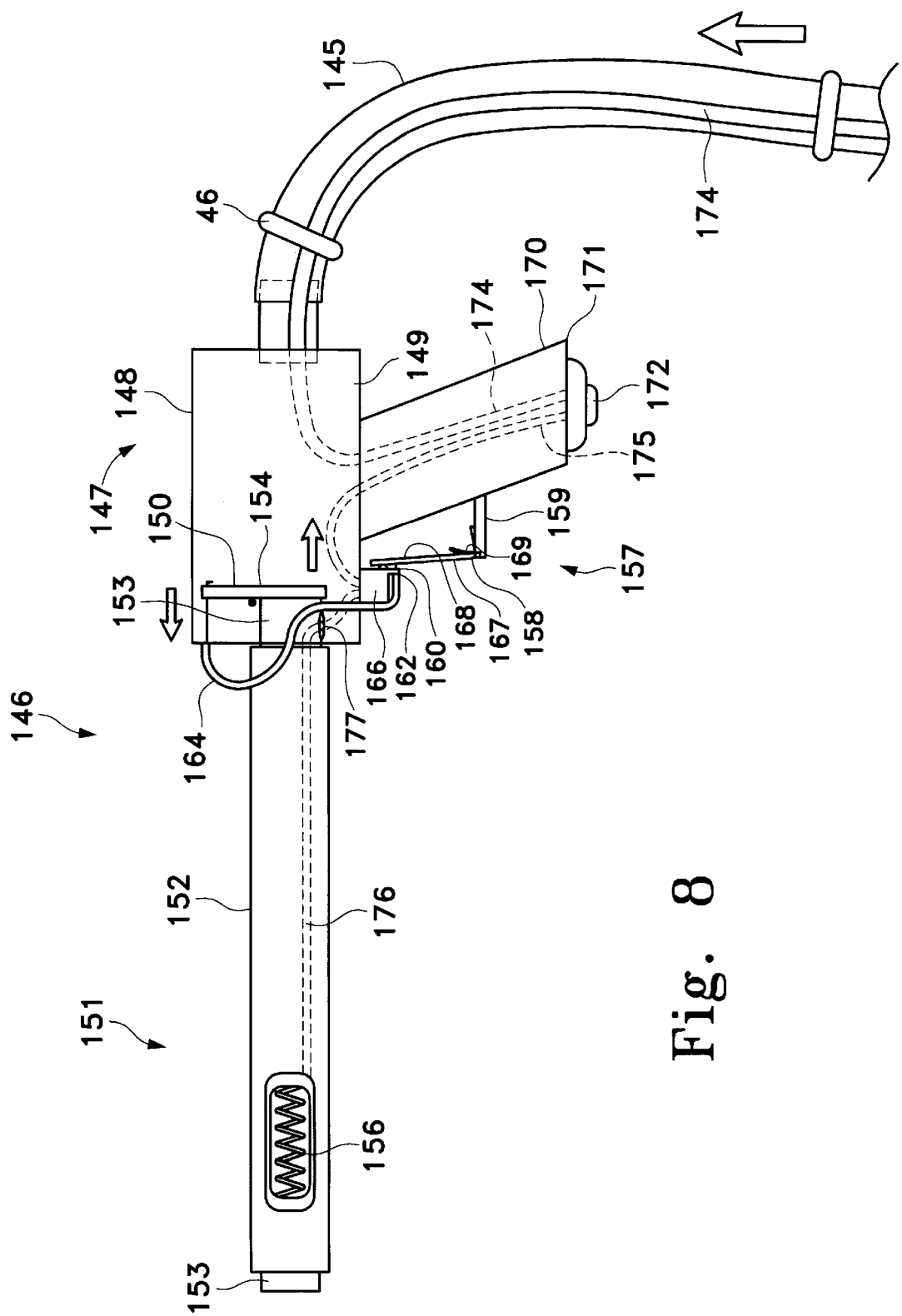

BIOLOGICAL VACUUM DEVICE TO ENHANCE ENVIRONMENTAL QUALITY

BACKGROUND OF THE INVENTION

1. Field of the Invention

This invention relates to a vacuum device that includes both a mechanism to chase pests from their hiding places, and a mechanism to aspirate the pests and their attendant abiotic and biological contaminants. It further relates to a method of chasing pests from their harborages and aspirating the pests and their attendant abiotic and biological contaminants.

2. Description of the Prior Art

Chemical pesticides are used to control pests such as arthropods that inhabit houses, hospitals, restaurants, businesses, animal care facilities, farm buildings, etc. However, recent concerns about pesticides such as resistance of pests to chemical pesticides, hazardous exposure to pesticide applying personnel, environmental contamination, destruction of natural biocontrol agents, such as beneficial insects, and lack of newly developed pesticides have increased the need for alternative control methods. Furthermore, as pests become more resistant to pesticides, more frequent treatments are required which increases the human health hazard.

Efforts in managing pests with less reliance on pesticides have resulted in the use of typical vacuum cleaner devices or portable vacuum cleaner devices to remove arthropod pests such as cockroaches, ants, fleas, mites, pillbugs, sowbugs, centipedes, silverfish, beetles, and other small invertebrates. These devices are traditional in that they consist of a motor to generate a vacuum and a filtering device consisting of foam rubber and/or paper formed into a disposable bag to collect debris.

Cohen et al (Plant Disease, Volume 73(9), 765–768, 1989); Saufley (Journal of Economic Entomology, Volume 66 (3), 818–819, 1973), Clinch (New Zealand Entomologist, Volume 5 (1), 28–30, 1971) and U.S. Pat. No. 4,780,986 (Broomfield et al 1988) all disclose examples of vacuum devices for collecting live insects. U.S. Pat. No. 4,630,329 (Shores, 1986) discloses an example of a vacuum cleaner attachment that includes a flea comb and an insecticide treated trapping chamber for removing and killing flea eggs from animals.

These devices are not suitable as pest management devices because of a variety of deficiencies. For example, devices commonly known as wet/dry shop vacuums employ a foam filter to preclude dust from the motor workings while debris accumulates in a canister. These are inferior in pest management because exhaust air returned to the room typically is laden with fine dust and any biological contamination associated with the dust, such as bacteria and potentially allergenic plant and animal proteins. Wet/dry shop devices can tolerate water that is deliberately or unintentionally aspirated into the device via a float valve that precludes access of water into the motor working; however, this requires that the device always be used in an upright position which restricts the versatility of the vacuum device. For example, such a device cannot be worn on the back of the operator unless the operator always maintains it in an upright position. Normal activities of a pest control operator may require a backpacked device to be used while crawling (non-upright attitude) in attics, crawl spaces, or among industrial equipment such as those used in commercial food manufacturing or food preparation facilities.

For devices using paper bags for high efficiency particulate (HEPA) air filtration, biological contaminants are not released in the exhausted air. However, these bags reach capacity fairly quickly and require a relatively strong and relatively noisy motor to compensate for high debris-load in order to maintain a strong vacuum. The bags must be replaced fairly frequently. Such HEPA devices are inferior in situations where even a small amount of liquid can be aspirated into the device since the liquid will damage the filter bag.

Use of traditional vacuum devices does not allow collection of insect pests in a healthy state which may be necessary to confirm susceptibility of insects to insecticides especially when these insecticides will be used outdoors to preclude re-infestation of an indoor facility. Furthermore, these devices do not allow for easy examination of aspirated materials to confirm species of pests or to retrieve valuable objects that may be aspirated incidentally.

Use of traditional vacuum devices also requires a method for forcing pests from their hiding places. Typically, this requires the use of a chemical irritant, usually pyrethrin or pyrethroid insecticides. Consequently, there are still risks to humans associated with the use of a chemical pesticide and the use of these toxins greatly restricts the areas where vacuum devices for pest management can be used. For example, liquids or sprays cannot be used near electrical panels and many pesticides are not registered for use in health care or food preparation facilities.

Traditional vacuum devices lack flexibility that is a requisite for specialized work such as insect and biologic pest management. Areas targeted for pest management are variable in terms of the typical use of the facilities, such as, for example, health care, food preparation, electronics; special requirements inherent in the nature of the facilities, such as for example, cramped quarters in crawl and attic spaces, clean air in electronics manufacturing facilities; and the health status of occupants, such as, for example, respiratory-compromised allergies, immunologically compromised convalescents, infection-prone post-operative patients, or chemical sensitive patients. While various vacuum devices have been developed to remove arthropod pests, there still remains a need in the art for a more effective device for pest management which removes the pests and allergens while allowing for identification of pests and the collection of live pests for further determination of additional pest management strategies. The present invention described below solves the problems related to prior art devices currently used for pest management. The vacuum device of the present invention (1) is fully functional in all vertical and non-vertical positions; (2) does not exhaust potentially allergenic contaminants contained in the aspirated air and debris; (3) can tolerate aspiration of some liquid without compromising safety or efficacy (e.g. strength of vacuum); (4) provides a manner to view aspirated material to confirm identification of pests or to retrieve objects aspirated inadvertently; and (5) forces pests from their hiding place without the use of conductive liquids or chemical irritants (toxins) to suit specific needs of each pest management situation. The present invention provides a versatile strategy for controlling pests which is different from the prior art devices and solves some of the problems associated with the prior art devices.

SUMMARY OF THE INVENTION

It is therefore an object of the present to provide a vacuum device which chases arthropod pests from their harborages and aspirates the pests.

Another object of the present invention is to provide a vacuum device which exhausts heated air through an auxiliary housing in order to chase arthropod pests from their harborages.

A further object of the present invention is to provide a vacuum device which aspirates pests, attendant abiotic and biological contaminants without exhausting these contaminants back into the environment from which they were removed.

Another object of the present invention is to provide a viewable collection means for immediate inspection of aspirated objects.

A further object of the present invention is to provide a system of filter means providing exhaust air which is free of most particulate matter including allergens, dust, debris, liquid, fine dust, pests, and objects.

A still further object of the present invention is to provide a vacuum device with a variable vacuum in order to capture healthy pests.

Further objects and advantages of the present invention will become apparent from the following description.

BRIEF DESCRIPTION OF THE DRAWINGS

FIG. 5a is a cutaway side view of filter assembly 94 showing funnel member 62, filtering element 93, stop piece 89, hollow spindle 98 and solid disk 91.

FIG. 5b is a top view of filter assembly 94 showing hollow spindle 90, stop piece 89, funnel member 62 and lower opening 63 of funnel member 62.

FIG. 5c is a cutaway side view of another embodiment of filter assembly 94 showing funnel member 62, filtering element 93 and wire-like cylindrical cage 95.

FIG. 5d is a cutaway side view of another embodiment of filter assembly 94 showing funnel member 62, filtering element 93 and retainer means 97.

FIG. 5e is a cutaway side view of filter assembly 101 showing funnel member 62, spindle means 103, stop piece 89, disk 88, moisture absorbing means 104, filtering element 93 showing inner walls 105, outer walls 107 and inner cavity 109, and disc 87 with rod-shaped means 83.

FIG. 7b is a side view detail of another embodiment of trigger assembly 157 which has a trigger support 159 with spring 169 located on support 159 and the base 167 of trigger member 158.

FIG. 7c is a side view detail of another embodiment of trigger assembly 157 which has a piston-spring 155 attached to pistol grip 170 and trigger member 158.

FIG. 7d is an exploded view of piston spring 155 showing tubes 161 and 163, compression spring 178 and end caps 165.

FIG. 8 is a side view detail of another embodiment of hand-held heater/air exhaust assembly 146 including auxiliary vacuum hose 145 with releasable clamping members 46 and 120 VAC power cord 174; heater tube assembly 151 with heater tube insulating jacket 152, heater tube 153 and a cutaway showing heater element 156; pistol/chamber assembly 147 including chamber 148 with diaphragm 150 and trigger assembly 157 with pistol grip 170 that includes 120 VAC power cord 174, rheostat 172, third finger-actuated trigger member 158, trigger support 159, cable 160, cable support 162, and momentary contact switch 166.

DETAILED DESCRIPTION OF THE INVENTION

Figure 1:
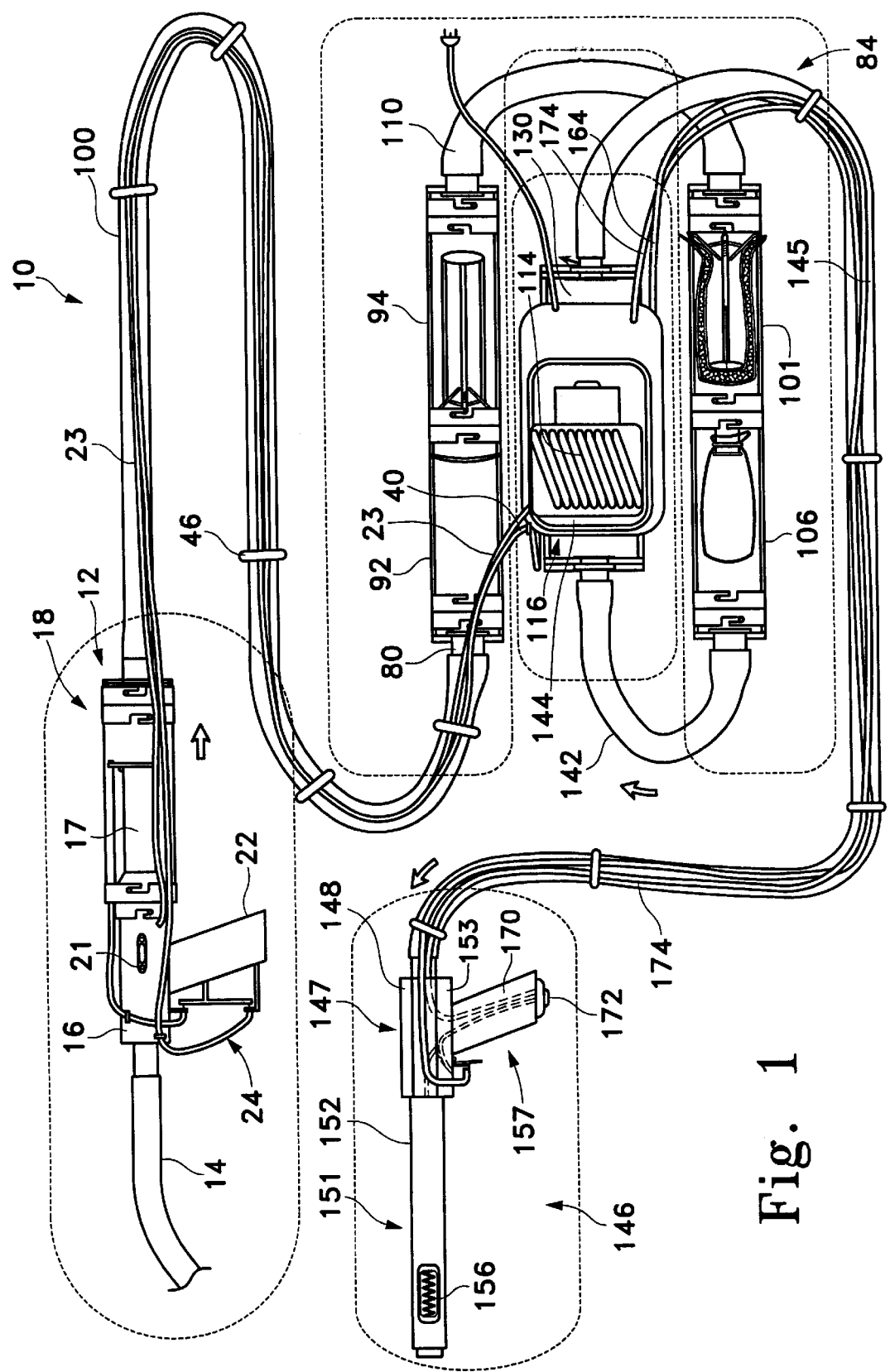
FIG. 1 is a top view of vacuum device 10 showing its four major components; an intake and collection unit 12, a system of filters 84, a vacuum motor 114 in housing unit 144, and a hand-held heater/air exhaust tube assembly 146.
Figure 2:
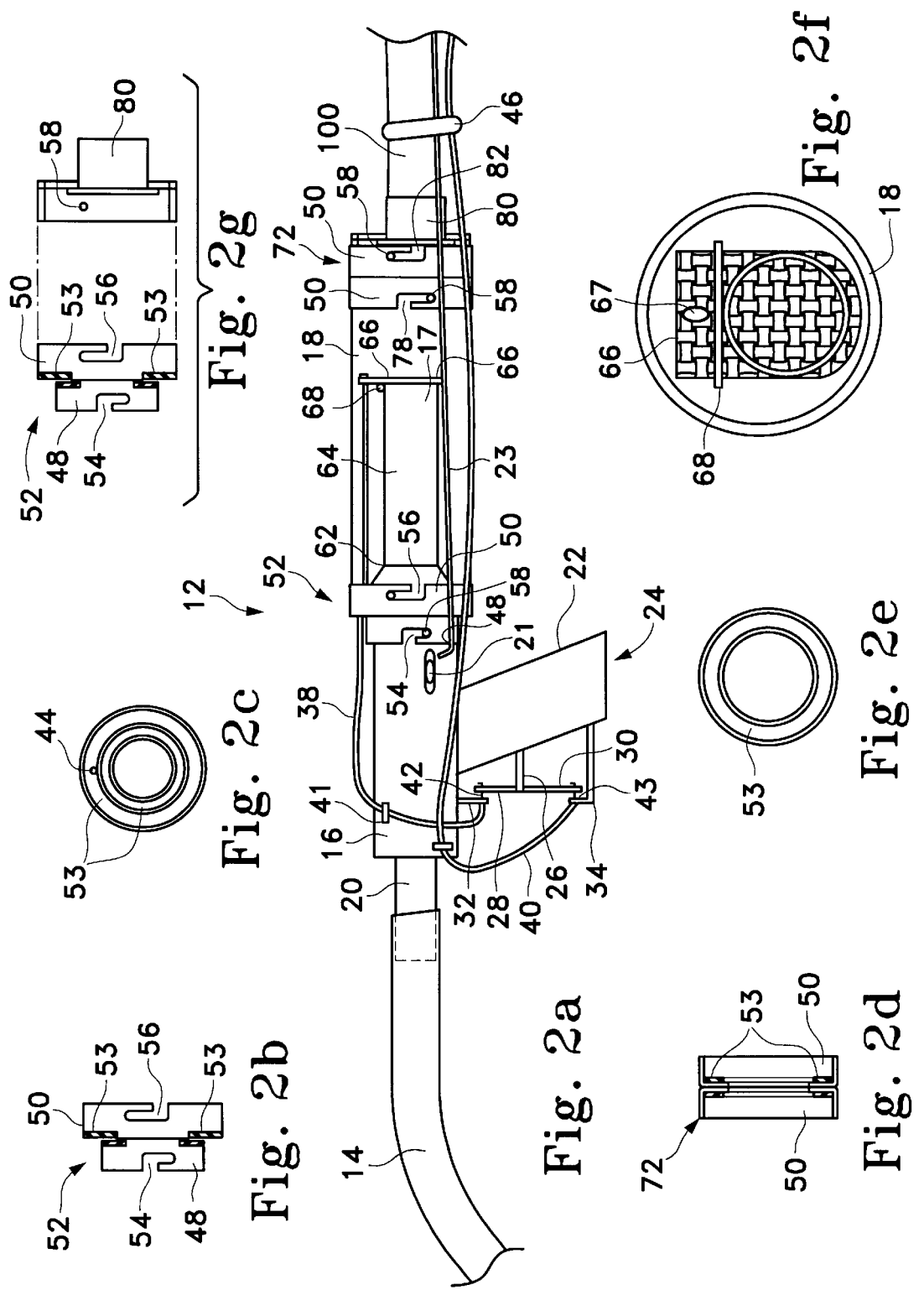
FIG. 2a is a side view of the intake and collection unit 12 showing flexible suction tube 14, pistol assembly chamber 16 and pass-through chamber 18 containing counting/viewing chamber 17.
FIG. 2b is a side view cut-away of twist adaptor 52 showing the position of O-rings 53.
FIG. 2c is a front view of dual twist adapter 52 showing sealing means 53 and cable port 44.
FIG. 2d is a side view of dual twist connector 72 showing each connector 50 making up the dual twist connector position of sealing means 53.
FIG. 2e is a front view of dual twist connector 72 showing the position of sealing means 53.
FIG. 2f is an end view of screen diaphragm 66 inside of pass thru chamber 18 showing hinge pin 68 for attachment to counting/viewing chamber 17.
FIG. 2g is a side view cut-away of dual twist adapter 52 and a typical vacuum hose connector 80 when chamber 18 is not used in vacuum device 10.
Figure 3:
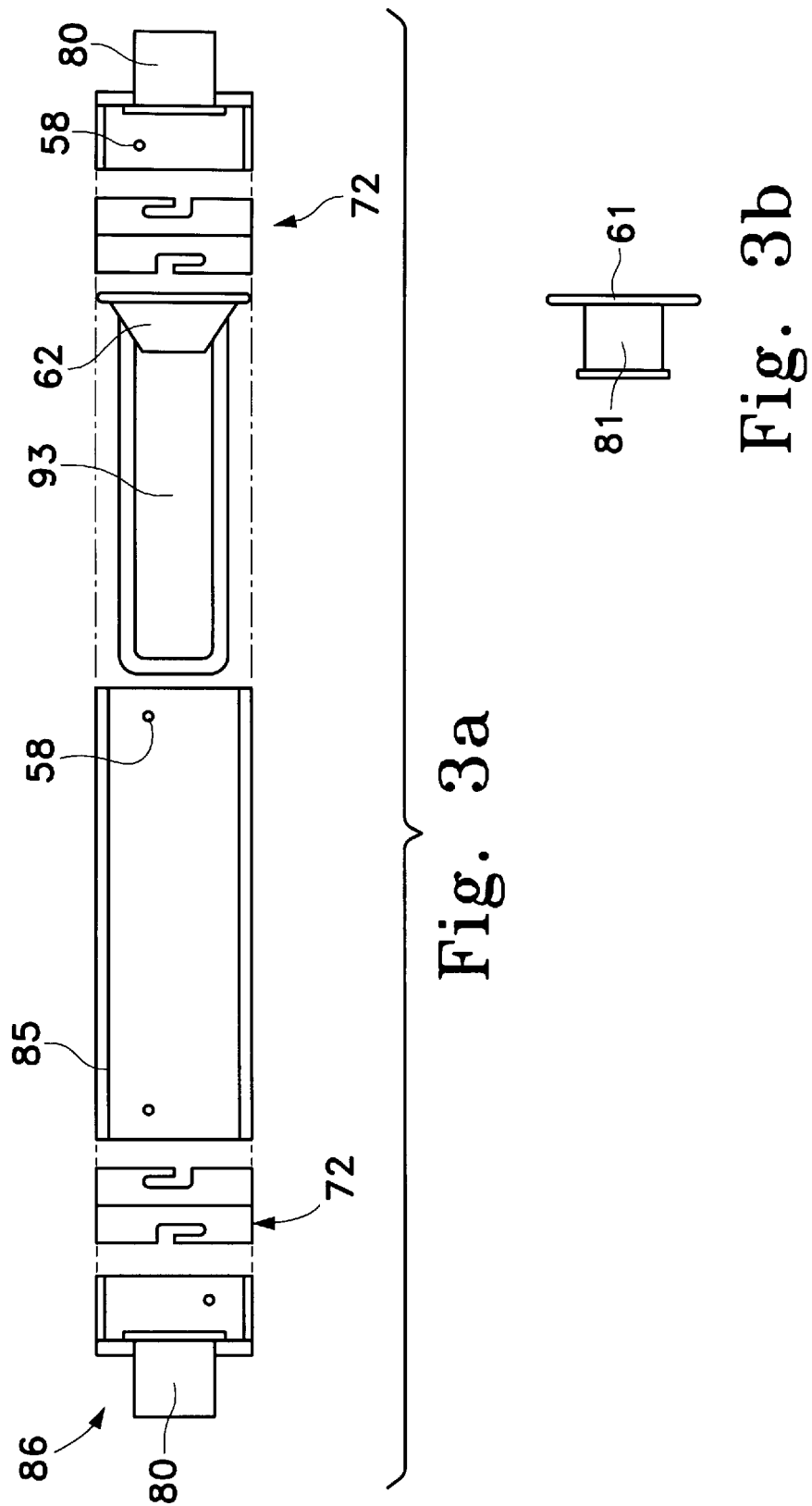
FIG. 3a is an exploded side view of a filter unit 86 showing, dual twist connector 72, hose connector 80, cylindrical guide pin 58, filtering element 93 and funnel member 62.
FIG. 3b shows a filter connector 81 which can replace funnel member 62 in FIG. 3a which is fitted with flange 61.

Vacuum device 10 incorporating the features of the present invention is illustrated in FIGS. 1–8. Device 10 (FIG. 1) includes a hand-held intake and collection unit 12, filter system 84, vacuum motor 114 in housing unit 144, and a hand-held heater/air exhaust tube assembly 146 which are all in fluid communication with each other.

Hand-held intake and collection unit 12 (FIGS. 1 and 2a–2g) is made up of a flexible suction intake tube 14, chamber 18 containing a counting/viewing chamber 17 and pistol assembly chamber 16 positioned between intake tube 14 and chamber 18 (FIG. 2a). Pistol assembly chamber 16 is constructed of light weight material such as, for example, a plastic or other suitably durable materials. It is attached to the inlet end of chamber 18 by dual twist adapter 52 which is a pair of twist quick connectors 48 and 50. The chamber openings of each connector are of sizes to fit their respective chamber (FIGS. 2c and 2e). The second interior openings of connectors 48 and 50 can be of approximately equal dimensions. Twist connectors 48 and 50 are permanently affixed together at their second interior openings to form dual twist adapter 52 (FIGS. 2a and 2b). Each connector 48 and 50 has sealing means 53, which can be, for example, O-rings, within the interior of each connector as illustrated in FIGS. 2b and 2c. The outlet end of chamber 16 fits within the chamber opening of connector 48. This end of chamber 16 has a cylindrical pin 58 extending radially outward from the side that engages cutout 54 of connector 48 (FIGS. 2a and 2b). Power switch 21, for operating motor 144, is affixed to the exterior side of chamber 16. Switch 21 alternatively can be located elsewhere such as, for example, on the motor housing. Cable housing 23 with cable (not shown) is connected to power switch 21 and to the wiring for motor 114. It runs along vacuum hose 100 and is held in place by releasable clamping members 46 (FIGS. 1 and 2a).

Tube 14 is releasably attached to the intake end of chamber 16 via nipple 20. Nipple 20 can be frictionally attached to the front of chamber 16, it can run the length of chamber 16 to funnel member 62 at the inlet end of chamber 18, or it can be an integral part of chamber 16. Tube 14 may be, for example, a flexible or rigid hose made up of plastic or other flexible material that is clear or opaque. A flexible tube 14 is preferred. Pistol-grip 22 is affixed to the base of chamber 16, or it can be an integral part of chamber 16, for ease of handling and supports trigger assembly 24 which includes stationary trigger support 26 and a first finger-actuated trigger member 28 which opens screened diaphragm 66 in chamber 18, and a second finger-actuated trigger member 30 which controls the force of the vacuum thru vacuum bleeder valve assembly 116 (FIGS. 1 and 2a); both members are hingedly connected to stationary trigger support 26. Trigger assembly 24 also includes cable supports 32 and 34.

Cable support 32 is affixed to the outside bottom of chamber 16 and extends downward just forward of the top end of first finger-actuated trigger member 28. A second cable support 34 is affixed to the lower front of pistol-grip 22 and extends outward below and just forward of second finger-actuated trigger member 30. The trigger end of cable housing 38 is connected to cable support 32 by a threaded bushing (not shown). A cable 42 is positioned within cable housing 38 and is fastened to first finger-actuated trigger member 28. Cable housing 38 is secured to the outside of chamber 16 via cable clamp 41 and terminates at cable port 44 (FIG. 2c) which is located on top of twist quick connector 50 (FIG. 2b). Cable 42 passes through cable port 44, through the upper part of pass-through chamber 18 and connects to diaphragm 66 using any conventional means. Alternatively, cable housing 38 can be flaired at the end to fit through the larger part of a tapered opening in cable support 32 then pushed into the tapered end of the opening in cable support 32 (not shown). Cable 43 is positioned within cable housing 40 and trigger end of cable 43 passes through a threaded bushing (not shown) and is connected to second finger-actuated trigger member 30 by any conventional means. Cable housing 40 containing cable 43 is secured to the outside of chamber 16 via cable clamp 41 and terminates at vacuum bleeder valve assembly 116 (FIG. 1) with cable 43 attaching to the top of rotator plate 124 (FIG. 6b) with any typical fastener, such as for example, a small screw. Cable housing 40 with cable 43 is secured to vacuum hose 100 with releasable clamping members 46. Cable housing 40 is also secured to housing unit 144 via a typical cable clamp (not shown).

Chamber 18 is constructed of clear plastic or PLEXIGLAS™ or other suitably clear materials. It is attached to the outlet end of chamber 16 by dual twist adapter 52 which is a pair of twist quick connectors 48 and 50, as described above. Like chamber 16 above, the inlet end of chamber 18 fits within the chamber opening of connector 50 which also has a cylindrical pin 58 extending radially from the side that engages cutout 56 (FIGS. 2a and 2b). Within the interior inlet end of chamber 18 is counting/viewing chamber 17 that allows for immediate inspection for confirmation of content (FIG. 2a). Chamber 17 is made up of funnel member 62 affixed to the inlet end of a cylindrical clear tube 64. Clear tube 64 can also be constructed of plastic, PLEXIGLAS™ or any other suitably clear materials. Screened diaphragm 66 is affixed to the outlet end of tube 64 via hinge pin 68 fastened to tube 64 (FIGS. 2a and 2f). Diaphragm 66 can be made of screening such as wire, plastic, fiberglass, etc, with openings sufficiently small to retain pests in counting chamber 17. The preferred material is stainless steel or heavy plastic mosquito screening. Hinge pin 68 includes a spring clip (not shown) which releasably seals diaphragm 66 against the outlet end of tube 64. The seal is broken by swinging diaphragm 66 in the upward direction by actuating first finger-actuated trigger member 28 which pulls cable 42 which is attached to the top of diaphragm 66 through diaphragm port 67 (FIG. 2f).

Hand-held intake and collection unit 12 is connected to vacuum device 10 through dual twist connector 72 at the outlet end of chamber 18. Connector 72 is made up of two twist quick connect adapters 50 of the same size which are permanently fixed together each of which contain sealing means 53, such as, for example, O-rings, as depicted in FIGS. 2a and 2d. Chamber 18 has a cylindrical pin 58 extending radially from the side that engages cut-out 78 of connector 50 (FIG. 2a). Alternatively, chamber 18 containing counting/viewing chamber 17 can be removed, if not needed, and a separate dual twist adaptor 52 without cable port 44 can be used with vacuum hose connector 80 (FIGS. 2a and 2g). The outlet side of connector 72 with sealing means 53 slides onto vacuum hose connector 80 which likewise has a cylindrical pin 58 extending radially from the side that engages cut-out 82 of connector 50 (FIG. 2a). Connected to the outlet end of connector 80 is vacuum hose 100 that operatively connects intake and collection unit 12 with the filter system 84 through a vacuum hose connector 80 located at the outlet end of hose 100 (FIGS. 1 and 2a).

Figure 4:
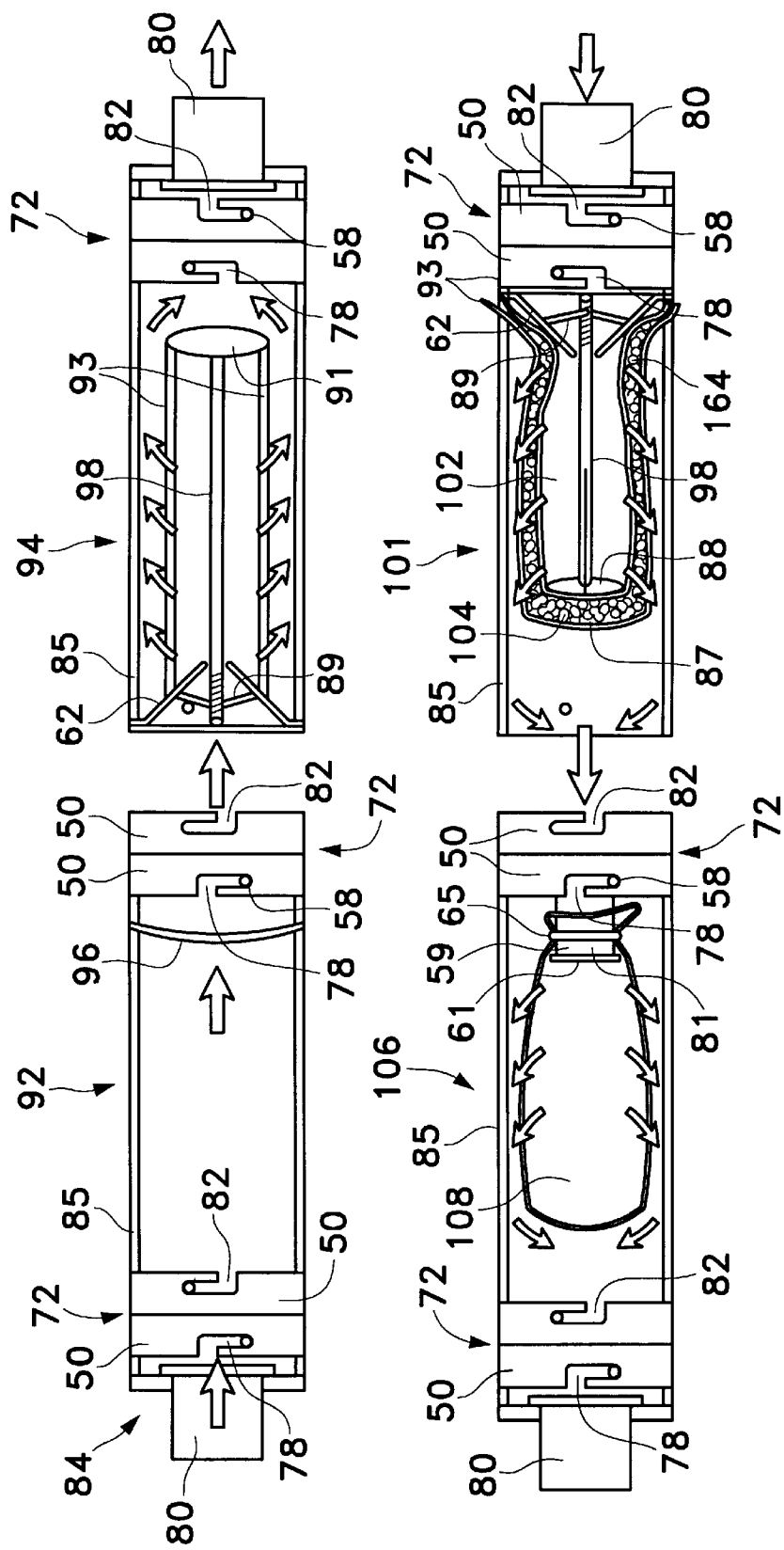
FIG. 4 is a side view cut-away of the system 84 of filter units 86 showing first filter assembly 92, second filter assembly 94, third filter assembly 101, and fourth filter assembly 106. Also shown, by bold arrows, is the direction of air flow.

Filter system 84 (FIGS. 1, 3a, 3b and 4) is made up of at least four filter units 86. System 84 is a flexible system since filters can be easily added or removed depending on the environment the system will be used in. For example, when used outdoors, there may be no need for a HEPA filter 108. The filter units are typically cylindrical chambers 85 (FIG. 3a). Chambers 85 may be arranged in parallel sets of two units each, as depicted in FIGS. 1 and 4 and described below or in any other configuration convenient for the user. Cylindrical shaped chamber 85 is preferably constructed of clear plastic or PLEXIGLAS® or other suitably clear or opaque materials. Chamber 85 typically contains a funnel member 62, filtering element 93, dual twist connectors 72, vacuum hose connectors 80, and cylindrical pins 58 (FIG. 3a).

Funnel member 62 can be replaced by any type of adaptor which will hold a filter in place in chamber 85 such as, for example, a modified vacuum hose connector such as filter connector 81 containing a flange 61 on its inlet end (FIG. 3b).

The order of filtering from hand-held intake and collection unit 12 to exhaust diverter valve assembly 130 should be coarse to fine filtering so that at least about 90% allergen-free air, defined for the purposes of this invention as clean air, is exhausted from the device. The last two filters should be a moisture filter in front of a HEPA filter when system 84 is used, especially in an enclosed area. The first set of filter units, as depicted in FIGS. 1 and 4, is made up of a first filter assembly 92 which is an insect collection and large debris filter assembly and a second filter assembly 94 which is a coarse filter assembly (FIG. 4). The interior of filter assembly 92 has a screening means 96 which can be any mesh suitable for collecting insects or debris down to approximately 3 mm in size. Examples of materials for screening means 96 are aluminum mosquito or window screening, hardware cloth, fiberglass or plastic screening, for example. Screening means 96 is located at the outlet end of chamber 85 of filter assembly 92 to preclude further passage of coarse material and maximize the capacity of chamber 85 as well as to facilitate the ease of changing screening means 96. If retrieval of intact pests or inadvertently collected objects is not desirable, screening means 96 can be replaced by any type of cloth liner (not shown) such as, for example, an anklet stocking or a disposable nylon mesh liner. The inlet end of first filter assembly 92 attaches to the outlet end of vacuum hose 100 at connector 80 with a dual twist connector 72 which fits onto hose connector 80 and first filter assembly 92, each of which has a cylindrical pin 58 extending radially from the side that engages cut-outs 78 and 82 on connectors 50, respectively. Likewise, the outlet end of first filter assembly 92 attaches to the inlet end of second filter assembly 94 with dual twist connector 72 which fits onto filter assemblies 92 and 94, each of which has a cylindrical pin 58 extending radially from the side that engages cut-outs 78 and 82 on adapters 50 respectively. Chamber 85 of second filter assembly 94 has funnel member 62, filtering element 93, and a support means 98 for filtering element 93 (FIGS. 4 and 5a–d). Funnel member 62 extends into the inlet end of filter assembly 94 and the outlet end with lower opening 63 of funnel member 62 is seated in the inlet end of filtering element 93 (FIGS. 4 and 5a–5d). Filtering element 93 is a synthetic fibrous filter such as those typically used as allergen filters in residential air ducts, such as, for example, fiberglass, polypropylene, rockwool, etc. The filtering material can be anything suitable for collecting at least some of the particulate matter which passes from first filter assembly 92. Particulate matter is defined as any dust, debris, and allergens, especially subcellular allergenic components, such as for example, proteins and parts of proteins. Element 93 is typically cylindrical in shape and is washable. Element 93 can be frictionally supported by support means 98 (FIG. 5a). Support means 98 includes solid disk 91, stop piece 89 and spindle 90. Solid disk 91 is attached to spindle 90 at the outlet end of assembly 94. Solid disk 91 can be any rigid material capable of supporting filtering element 93, especially under vacuum pressure. At the opposite end, spindle 90 is threaded to accept a stop piece 89 which is typically, for example, a toggle nut (FIGS. 4, 5a and 5b). Spindle 90 can be any rod-shaped material, hollow or solid, capable of supporting filtering element 93, especially under vacuum pressure (FIG. 5a). Stop piece 89 adjusts and frictionally fits against the sides of funnel member 62 to keep filter element 93 snug against disk 91. This is the most preferred embodiment. Alternatively, support means 98 can be, for example, a rigid, wire-like cylindrical cage 95 into which filtering element 93 fits (FIG. 5c). Cage 95 allows air to exit into filter assembly 94 and subsequent filter assemblies. In this embodiment, filtering element 93 is cylindrical shaped and enclosed at its base (FIG. 5c). Another embodiment of support means 98 includes filtering element 93 with an enclosed base and retainer means 97 (FIG. 5d). Retainer means 97 is, for example, any type of cloth liner, such as for example, an anklet stocking or tube sock cut to appropriate size. Retainer means 97 fits over filtering element 93 and frictionally fits over funnel member 62 to hold filtering element 93 in place (FIG. 5d). The outlet end of second filter assembly 94 attaches to the inlet end of vacuum hose 110 at a vacuum hose connector 80 with a dual twist connector 72 which fits onto connector 80 and filter assembly 94, each of which has a cylindrical pin 58 extending radially from the side that engages cut-outs 78 and 82 on adapters 50, respectively.

The above described first set of filter assemblies 92 and 94 are operatively connected to the second set of filter assemblies 101 and 106 with vacuum hose 110 through a vacuum hose connector 80 with a dual twist connector 72 which fits onto connector 80 and third filter assembly 101, each of which has a cylindrical pin 58 extending radially from the side that engages cut-outs 78 and 82 in adapters 50, respectively (FIG. 1). Third filter assembly 101 (FIGS. 4 and 5e) is a moisture trap filter assembly which has a chamber 85 containing funnel member 62, support means 98, stop piece 89, disk with rod-shaped means 87, disk 88 attached to hollow spindle 103, filtering element 93 and absorbing means 104. Disks 87 and 88 can be any rigid material capable of supporting filtering element 93, especially under vacuum pressure. Support means 98 is a hollow spindle 103 threaded at the inlet end of assembly 101 to accept stop piece 89 which is typically, for example, a toggle bolt which adjusts and frictionally fits against the sides of funnel member 62. Rod-shaped means 83 of disk with rod-shaped means 87 extends through disk 88 into hollow spindle 103 to allow for expansion of filtering element 93. Filtering element 93 is a moisture absorbing filtering element 102 (FIG. 4) which is a double-walled cloth bag with inner walls 105 and outer walls 107 defining an inner cavity 109 containing a moisture absorbing means 104 (FIG. 5e). Absorbing means 104 can be any moisture absorbing substance that absorbs approximately 400–500 times its weight in water, such as, for example, the starch polymers disclosed in U.S. Pat. No. 3,997,484 which is herein incorporated by reference. The double-walled bag can be, for example, two anklet stockings or two tube stockings, one inside the other, with absorbing means 104 placed between the two stockings (FIGS. 4 and 5e). The outlet end of filter assembly 101 attaches to the inlet end of fourth filter assembly 106 with a dual twist connector 72 which fits onto filter assemblies 101 and 106, each of which has a cylindrical pin 58 extending radially from the side engages cut-outs 78 and 82 on adapters 50 respectively. Fourth filter assembly 106 which is a HEPA filter assembly has a filter connector 81 with a flange 61 at its inlet end and a filtering element 93 (FIGS. 3b and 4). The outlet end of connector 81, having a flange 61, extends into the inlet end of filter assembly 106 and frictionally fits into the opening of filtering element 93. Alternatively, filter assembly 106 can have a funnel member 62 which extends into the inlet end of filter assembly 106 and frictionally fits into the opening of filtering element 93. Member 62 can be a funnel with an extended neck (not shown). A frictional band 65, typically an O-ring or rubber band, for example, slips over the top of element 93, securing it onto connector 81 or funnel member 62. Filtering element 93 is a typical, commercially available, vacuum HEPA filter 108. The outlet end of fourth filter assembly 106 operatively connects the hand-held intake and collection unit 12 and the filter system 84 to motor 114 using a vacuum hose 142 connected with a dual twist connector 72 which fits onto filter assembly 106 and vacuum hose connector 80 each of which has a cylindrical pin 58 radially extending from the side that engages cut-outs 78 and 82 on adapters 50 (FIGS. 1 and 4).

Figure 6B:
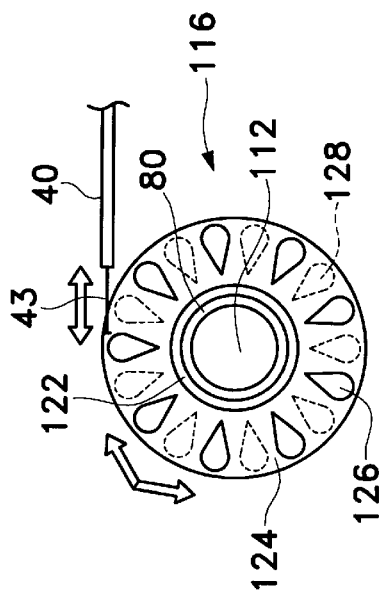
FIG. 6b is a top view of vacuum bleeder valve assembly 116 showing cable 43, cable housing 40, top rotator plate 124, vacuum hose connector opening 112, holes 126 in top rotator plate, bearing cup 122 and holes 128 in fixed plate.
Figure 6D:
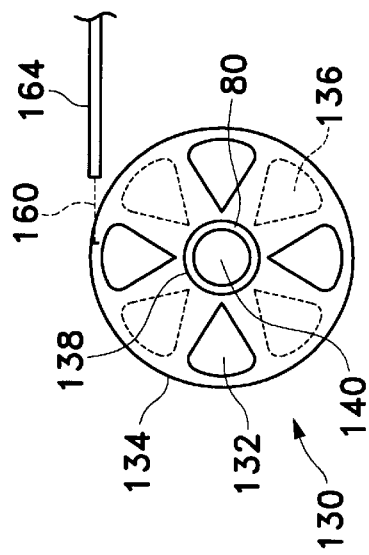
FIG. 6d is a top view of exhaust diverter valve assembly 130 showing cable 160, cable housing 164, vacuum hose connecter 80, vacuum hose connector opening 140, rotator plate 134, holes in top rotator plate 132, holes in fixed plate 136, and bearing cup 138.
Figure 6A:
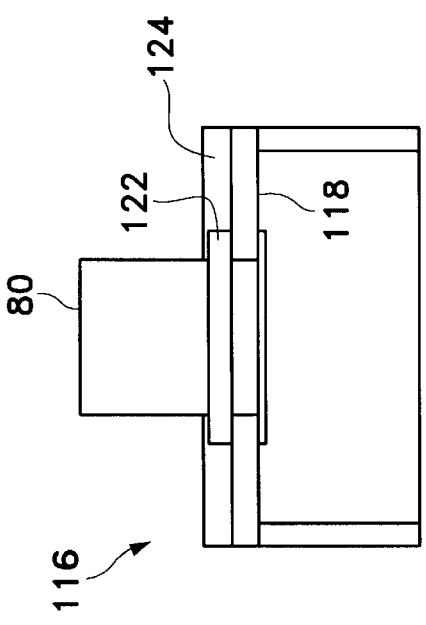
FIG. 6a is a side view of vacuum bleeder valve assembly 116 showing vacuum hose connector 80, bearing cup 122, top rotator plate 124, and bottom fixed plate 118.
Figure 6C:
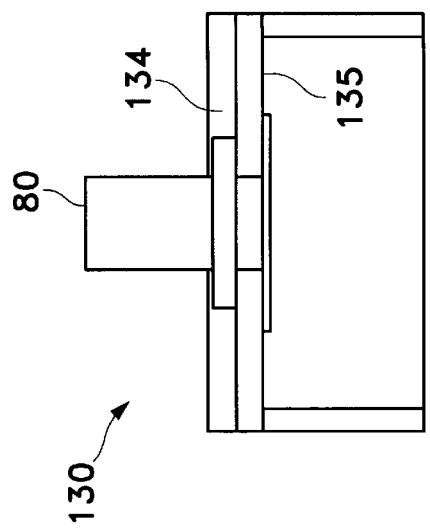
FIG. 6c is a side view of exhaust diverter valve 130 showing vacuum hose connector 80, rotator plate 134 and fixed plate 135.

Motor 114 is typically a standard bypass vacuum motor with universal windings that allow variable voltage without damage to the motor. The preferred embodiment is a 220 VAC motor operated at 110 VAC, however, other bypass motors with other voltage configurations are acceptable. The motor end of vacuum hose 142 frictionally fits over hose connector 80 which is inserted through vacuum bleeder valve assembly 116 from beneath a fixed plate 118 through vacuum hose connector opening 112 which runs through rotator plate 124, bearing cup 122 and fixed plate 118 (FIGS. 1 and 6a–6b). Connector 80 is affixed to plate 118 using glue, screws, etc. Connector 80 can also be frictionally attached through assembly 116 (FIGS. 6a and 6b). Vacuum bleeder valve assembly 116 has a top rotator plate 124 which has tear-drop-shaped holes 126 cut through it (FIGS. 6a and 6b). Plate 124 is generally constructed of any polymeric material such as, for example, PLEXIGLAS™. Holes 126 are spaced so that an area greater in size of the hole is retained between holes. At the center of plate 124 is bearing cup 122 with vacuum hose connector opening 112 which is frictionally recessed into plate 124. A bottom fixed plate 118, identical in size to plate 124, has an equal number of holes 128 cut into it. Cut into the middle of plate 118 and 124 is vacuum hose connector opening 112 of dimensions to accept hose connector 80. Top rotator plate 124 and lower fixed plate 118 are positioned so that the holes 126 and 128 coincide until trigger 30 is depressed. On the exhaust end of motor 114 is exhaust diverter valve assembly 130 (FIG. 6c). In one embodiment, assembly 130 is similar to a standard vacuum diverter valve except that the holes 132 on rotator plate 134 and the holes 136 on the fixed plate 135 are larger in size and the assembly is hand operated (See FIG. 6d, except that hand operated embodiment does not have elements 160 and 164). In the hand-operated embodiment, the degree of rotation is less important since only a small amount of exhausted air is needed to be diverted to hand-held heater/air exhaust tube assembly 146. When valve assembly 130 is rotated manually by hand to align the holes 136 on both plates 134 and 135, most of the air is diverted through the holes, direct-venting most of the exhaust air into the immediate environment. In a more preferred embodiment, especially for manufacturing purposes, exhaust diverter valve assembly 130 (FIG. 6d) can be the same assembly as vacuum bleeder valve assembly 116, described above and shown in FIGS. 6a and 6b. In this embodiment, assembly 130 is actuated by trigger assembly 157 as described for trigger assembly 24. For both embodiments of assembly 130, hose connector 80 is inserted through assembly 130 through vacuum hose connector opening 140 which runs through rotator plate 134, bearing cup 138, and fixed plate 135 (FIGS. 1 and 6c–6d) from beneath the fixed plate 135. Connector 80 is permanently affixed to the fixed plate of assembly 130. Connector 80 of assembly 130 is a smaller size than that in vacuum bleeder valve assembly 116, in the first described embodiment since only a portion of the exhaust air is needed to be diverted to the hand-held heater/air exhaust tube assembly 146. Auxiliary vacuum hose 145 frictionally fits onto the outlet end of connector 80 and operatively connects motor 114 with hand-held heater/air exhaust tube assembly 146 when holes 132 and 136 of assembly 130 are not aligned since this directs air through hose connector 80 (FIGS. 1 and 6a).

Hand-held heat/air exhaust tube assembly 146 (FIGS. 1, 7a, 7b and 8) is made up of heater tube assembly 151 and pistol/chamber assembly 147. The configuration of assembly 147 is dependent on the type of exhaust diverter valve assembly 130 attached to motor 114.

Figure 7A:
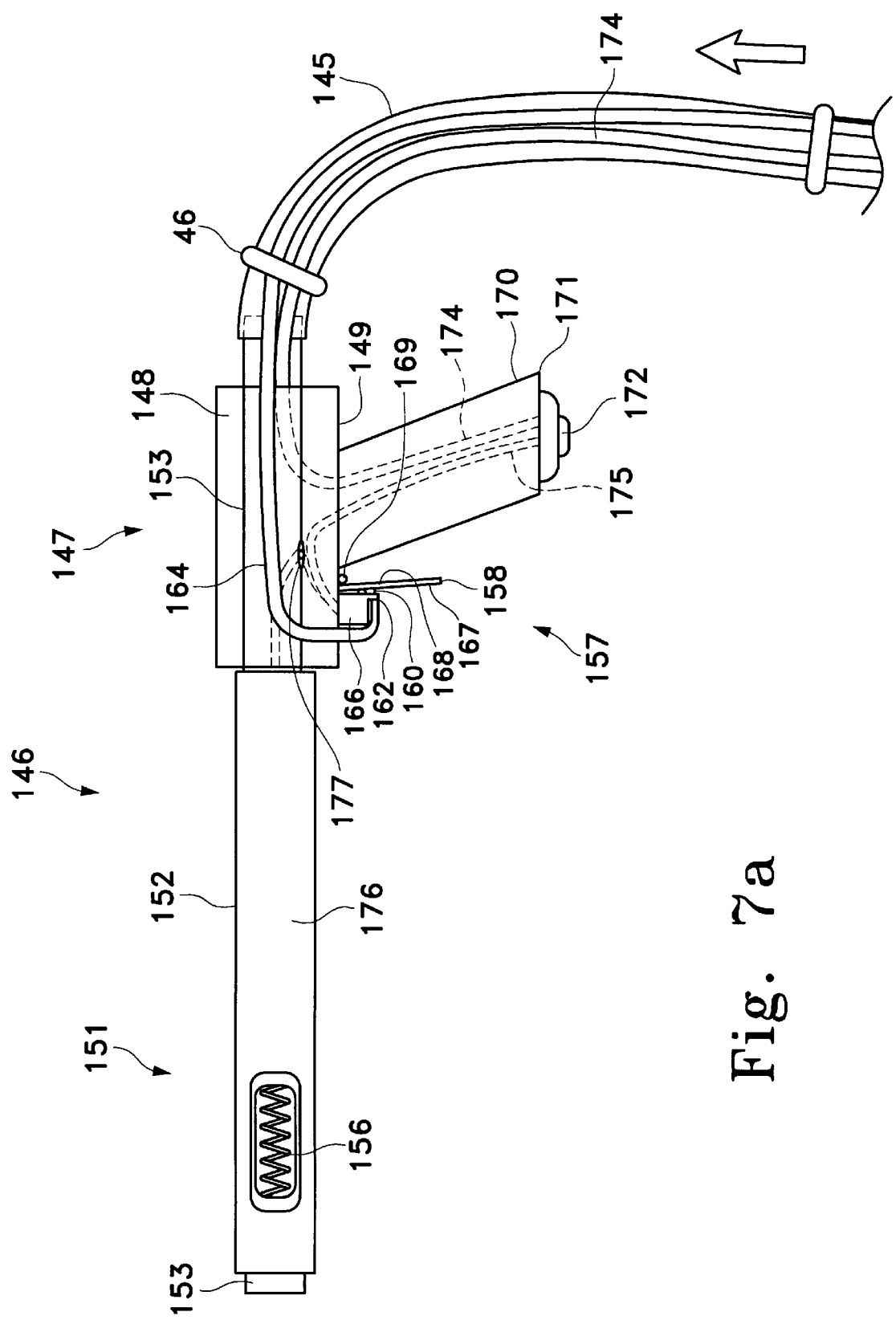
FIG. 7a is a side view detail of hand-held heater/air exhaust assembly 146 including auxiliary vacuum hose 145 with releasable clamping members 46, cable housing 164 and 120 VAC power cord 174; heater tube assembly 151 with heater tube insulating jacket 152, heater tube 153, and a cutaway showing heater element 156; pistol/chamber assembly 147 including chamber 148 and trigger assembly 157 which is made up of pistol grip 170 with 120 VAC power cord 174, rheostat 172, third finger-actuated trigger member 158 with spring 169 located at top of trigger member 158, cable 160, cable support 162, and momentary contact switch 166.

Heater tube assembly 151 (FIGS. 7a and 8) is made up of heater tube 153, heater tube insulating jacket 152, and heater element 156. Heater tube 153 is typically an elongated rigid tube constructed of metal or heat-resistant plastic or composites. Tube 153 frictionally attaches to chamber 148 of pistol/chamber assembly 147 through an opening (not shown) in the outlet end of chamber 148. In the more preferred embodiment, heater tube 153 extends through the entire length of chamber 148 and out the inlet end of 148, frictionally attaching to auxiliary vacuum hose 145 (FIG. 7a). In another embodiment, tube 153 extends into chamber 148 approximately a quarter of the length of chamber 148 (FIG. 8). In both embodiments of chamber 148, the portion of tube 153 extending out from the outlet end of chamber 148 is surrounded by heater jacket 152 which can be any heat insulating material (FIGS. 7a and 8). Approximately two thirds down the length of tube 153, from the outlet end of chamber 148, is heater element 156 which is affixed to the interior space of tube 153. Placement of element 156 any where in tube 153 is well within the ordinary skill in the art. Heater element 156 is typically a wire resistance heater or a ceramic heater and is wired to rheostat 172.

Pistol/chamber assembly 147 is made up of pistol assembly chamber 148 and trigger assembly 157. The most preferred embodiment of chamber 148 is with heater tube 153 extending through the entire length of chamber 148 (FIG. 7a). In another embodiment, chamber 148 frictionally attaches to the inlet end of heater tube 153 where tube 153 extends into chamber 148 (FIG. 8). Within chamber 148 and at the inlet end of tube 153, is diaphragm 150 which hingedly attaches to chamber 148 via hinge pin 154 which also includes a spring clip (not shown) which releasably seals diaphragm 150 against tube 153. The seal is broken by actuating third finger-actuated trigger member 158 which pulls cable 160. Cable 160 is fastened to diaphragm 150 by passing through a cable port (not shown) in chamber 148 and attaches on the inlet side of diaphragm 150. This causes the lower part of diaphragm 150 to swing away from tube 153. Diaphragm 150 is constructed of any solid, rigid material such as, for example, a plastic or composite material. Chamber 148 is constructed of any light weight plastic or any other suitably durable materials.

Trigger assembly 157 is affixed to the exterior base 149 of chamber 148. For chamber 148 with tube 153 extending through its entire length, the most preferred embodiment of trigger assembly 157 includes pistol grip 170 with rheostat 172, momentary contact switch 166 and finger-actuated trigger member 158 which hingedly attaches to base 149 of chamber 148 through spring 169 (FIG. 7a). Top 168 of trigger member 158 is held firmly against momentary contact switch 166 by spring 169 which is located at top 168 of trigger member 158 between trigger member 158 and pistol grip 170. Spring 169 is affixed to member 158 and base 149 of chamber 148. Another embodiment of trigger assembly 157, usable with both embodiments of chamber 148, includes a trigger support 159 attached to grip 170 (FIGS. 7b or 8). Third finger-actuated trigger member 158 is hingedly connected at its base 167 to support 159 through spring 169 which holds top 168 of trigger member 158 firmly against momentary contact switch 166. A third embodiment of trigger assembly 157, usable on either chamber 148, includes a solid trigger 158 affixed to chamber 148 with a piston spring 155 located between trigger 158 and grip 170 (FIG. 7c). Piston spring 155 is made up of two rigid tubes 161 and 163, each of a different diameter, which fit one inside the other (FIG. 7d). An approximately ¼" O.D. compression spring 178 is placed inside tube 163, the smaller diameter tube. Spring 178 can be of any size which will allow adequate tension to hold trigger 158 firmly against momentary contact switch 166. Tube 163, containing spring 178 is placed inside tube 161. The ends of tube 161 and 163, which are attached to grip 170 and trigger 158, are capped with any suitable capping means 165. Piston spring 155 is releasably attached to trigger 158 and grip 170 by any suitable means, including frictional attachment.

In all embodiments of trigger assembly 157, cable 160, in cable housing 164, is fastened to the top 168 of trigger member 158. The trigger end of cable housing 164 is connected to cable support 162 by a threaded bushing (not shown). The trigger end of cable 160 passes through the bushing and is connected to third finger-actuated trigger member 158. For any trigger assembly 157 used with chamber 148 having tube 153 running through its entire length, as depicted in FIG. 7a, the other end of cable housing 164 with cable 160 terminates at exhaust diverter valve assembly 130 with cable 160 attaching (FIG. 6d) to the top of rotator plate 134 with any typical fastener, such as, for example, a small screw (FIGS. 1 and 6d). This is identical to the cable mechanism depicted in FIG. 6a. Cable housing 164 with cable 160 is secured to auxiliary vacuum hose 145 with releasable clamping members 46. For any trigger assembly 157 embodiments attached to chamber 148 containing diaphragm 150 (FIG. 8), cable 160 within cable housing 164, runs from the trigger end up through a cable port (not shown) in chamber 148 and attaches to the inlet side of diaphragm 150 as described above.

In all embodiments of trigger assembly 157, pistol grip 170 includes rheostat 172 which is attached to base 171 of grip 170. Two 120 VAC cords, 174 and 175, are wired to rheostat 172 and both extend through the length of grip 170. Rheostat 172 controls the temperature of heater element 156 through switch 166 and power cord 176. Cord 174 enters chamber 148 behind grip 170 and connects to rheostat 172. It is clamped to auxiliary vacuum hose 145 with releasable clamping members 46 and connects to the wiring for motor 114 (FIG. 1). Cord 176 extends from rheostat 172 into chamber 148 and is wired to momentary contact switch 166. Cord 175 then extends from switch 166 through a grommet 177 in the base of tube 153 into heater tube 153 and is wired to heater element 156. A frame (not shown) supports device 10 and can be a rigid aluminum or plastic frame, such as a typical backpack frame for campers or scuba divers. Device 10 can be secured to its frame using any number of means such as, for example, large hose clamps, elastic cords, belts, etc. The frame can be equipped with wheels, snap-on or permanent, also allowing device 10 to be pulled along the floor or ground.

In operation, a stream of hot air is applied to suspected pest harborages to force pests, such as cockroaches, from the harborages. In the preferred embodiment of hand-held heater/air exhaust tube assembly 146, exhaust air is diverted from motor 114 (FIGS. 1 and 7a) by depressing third finger-actuated trigger member 158 in order to rotate plate 134 of exhaust diverter valve assembly 130 so that holes 132 partially do not align with holes 136 (FIG. 6d). This allows some of the exhaust air to pass to heater tube 153 through auxiliary hose 145 (FIGS. 1 and 7). Simultaneously, as air enters heater tube 153 by depressing trigger member 158, the contact between trigger member 158 and momentary contact switch 166 is broken activating heater element 156 which heats the air as it passes through tube 153.

In the second embodiment of assembly 146, exhaust air is diverted from motor 114 (FIGS. 1 and 8) by manually rotating plate 134 of diverter valve assembly 130 so that holes 132 and 136 partially do not align (FIGS. 6c and 6d, except that the hand operated embodiment does not include elements 160 and 164). This allows some of the exhaust air to pass through connector 80 and enter heater/air exhaust tube assembly 146 through auxiliary hose 145 (FIGS. 1 and 8). Third finger-actuated trigger 158 is depressed by the operator to open diaphragm 150, which covers heater tube 153, allowing the air from hose 145 to enter tube 153 and pass over heater element 156. Simultaneously, as air enters tube 153, trigger member 158 is depressed and the contact between trigger member 158 and momentary contact switch 166 is broken which activates the heater element and heats the air as it passes through tube 153.

In both embodiments, rheostat 172 controls the amount of current available to heater element 156 and allows the operator to control the temperature of the air entering tube 153. Power is supplied to rheostat 172 through a 120 VAC power cord 174 that runs along auxiliary hose 145 and attaches to the wiring of motor 114. The operator uses temperature, volume and direction of this heated air to discover harborages of pests and to force them to exit these harborages. Consequently, hand-held intake and collection unit 12 is then used by the operator to aspirate the pests and the debris from their harborages.

When the pests begin exiting their harborage, the operator uses unit 12 (FIGS. 1 and 2) to catch the pests, dust, debris, and any other objects in the vacuum created by motor 114 through flexible suction tube 14 affixed to nipple 20. The objects pass through pistol chamber assembly 16 and first funnel member 62 into counting/viewing chamber 17 which is enclosed by a larger clear pass-thru chamber 18 that allows immediate inspection of chamber 17 for confirmation of contents. Insects and debris are held in place within chamber 17 via screened diaphragm 66 affixed to the outlet end of chamber 17 with hinge pin 68 which contains a typical spring clip to keep the diaphragm sealed against the end of chamber 17 under normal operation. To release the insects and debris from chamber 17, first finger-actuated trigger member 28 is depressed causing cable 42 within cable housing 38 to pull the top of diaphragm 66 toward funnel member 62 causing diaphragm 66 to open. Next, second finger-actuated trigger member 30 is depressed pulling a second cable 43 through cable housing 40 which results in an increase in the strength of the vacuum by rotating top rotator plate 124 of vacuum bleeder valve assembly 116 so that the holes of plate 124 and fixed plate 118 do not align. Trigger member 30 completely controls the force of the vacuum. When trigger member 30 is not depressed, the vacuum force is approximately 4 inches water lift (holes in bleeder valve assembly 116 are fully aligned). When trigger member 30 is fully depressed, the vacuum force is about 28 inches water lift (holes in bleeder valve assembly 116 are fully unaligned, i.e. closed). The increase in vacuum strength pulls the material from chamber 17 through dual twist connector 72 into vacuum hose 100 to the first filter assembly 92 (FIG. 4). Coarse materials passing through filter assembly 92, such as insects or inadvertently collected objects, are retained in filter assembly 92 by screening means 96. If retrieval of intact pests or objects is not desirable, a disposable nylon mesh liner (not shown) can be used in place of screening means 96. Any materials not retained by screening means 96 or a nylon mesh liner pass through a second funnel member 62 into second filter assembly 94 which consists of a synthetic fibrous filtering element 93 as typically used in allergen filters in residential air ducts. Small insect parts, excrement of pests and any small particles are retained by this filter assembly. Material passing through filter assembly 94 passes through vacuum hose 110 into a third funnel member 62 and third filter assembly 101. Within filter assembly 101 is a moisture absorbing filtering element 102 as described above. This filter absorbs any moisture collected in order to protect HEPA filter element 108 in fourth filter assembly 106 and motor 114. Materials passing through filter assembly 101 enter fourth filter assembly 106 through a filter connector 81 or a fourth funnel member 62. Filter assembly 106 contains a typical HEPA paper filter bag for filtering element 108. Any air exiting filter assembly 106 is clean air.

Clean air exiting filter assembly 106 into vacuum hose 142 passes through vacuum bleeder valve assembly 116 into vacuum motor 114 and exits as exhaust through exhaust diverter valve assembly 130. The air can be directly vented into the environment or directed to heater/air exhaust assembly 146 (as described above) by rotating plates 124 or 134 of exhaust diverter valve assembly 130 to misalign holes in the plates (FIGS. 1 and 6a–d).

The foregoing detailed description is for the purpose of illustration. Such detail is solely for that purpose and those skilled in the art can make variations therein without departing from the spirit and scope of the invention.

INDEX OF THE ELEMENTS

10. Vacuum Device
12. Hand-held Intake and Collection Unit
14. Flexible Suction Intake Tube
16. Pistol Assembly Chamber
17. Counting/Viewing Chamber
18. Pass-Thru Chamber
20. Nipple
21. Power Switch
22. Pistol Grip
23. Cable Housing
24. Trigger Assembly
26. Stationary Trigger Support
28. First Finger-actuated Trigger Member
30. Second Finger-actuated Trigger Member
32. Cable Support
34. Cable Support
38. Cable Housing
40. Cable Housing
41. Cable Clamp
42. Cable
43. Cable
44. Cable Port
46. Releasable Clamping Member
48. Twist Quick Connector
50. Twist Quick Connector
52. Dual Twist adaptor
53. Sealing Means
54. Cut-out
56. Cut-out
58. Cylindrical Pin
61. Flange
62. Funnel Member
63. Lower Opening of Funnel Member 62
64. Cylindrical Clear Tube
65. Frictional Band
66. Screened Diaphragm
67. Diaphragm Port
68. Hinge Pin
72. Dual Twist Connector
78. Cut-out
80. Vacuum Hose Connector
81. Filter Connector
82. Cut-out
83. Rod-shaped Means of Disk 87
84. Filter System
85. Cylindrical Chamber
86. Filter Units
87. Disk with Rod-Shaped Means
88. Disk fixed to hollow spindle
89. Stop Piece
90. Spindle
91. Disk
92. First Filter Assembly
93. Filter Element
94. Second Filter Assembly
95. Cylindrical Cage
96. Screening Means
97. Retainer Means
98. Support Means
100. Vacuum Hose
101. Third Filter Assembly
102. Moisture Absorbing Filtering Element
103. Hollow Spindle
104. Moisture Absorbing Means
105. Inner Walls of Filtering Element 101
106. Fourth Filter Assembly
107. Outer Walls of Filtering Element 101
108. HEPA Filter
109. Inner Cavity of Double Walls
110. Vacuum Hose
112. Vacuum Hose Connector Opening
114. Vacuum Motor
116. Vacuum Bleeder Valve Assembly
118. Fixed Plate
122. Bearing Cup
124. Top Rotator Plate
126. Tear-Drop-Shaped Holes In Top Rotator Plate
128. Tear-Drop-Shaped Holes In Fixed Plate
130. Exhaust Diverter Valve Assembly
132. Holes in Top Rotator Plate
134. Rotator Plate of Exhaust Diverter Valve Assembly
135. Fixed Plate of Exhaust Diverter Valve Assembly
136. Holes in Fixed Plate
138. Bearing Cup of Exhaust Diverter Valve Assembly
140. Vacuum Hose Connector Opening
142. Vacuum hose
144. Housing Unit
145. Auxiliary Vacuum hose
146. Hand-held Heater/Air Exhaust Tube Assembly
147. Pistol/Chamber Assembly
148. Chamber
149. Exterior of Base
150. Diaphragm
151. Heater Tube Assembly
152. Heater Tube Insulating Jacket
153. Heater Tube
154. Hinge Pin 155. Piston-spring
156. Heater Element
157. Trigger Assembly
158. Third Finger-actuated Trigger Member
159. Trigger Support
160. Cable
161. Tube
162. Cable Support
163. Tube
164. Cable Housing
165. Capping Means
166. Momentary Contact Switch
167. Base of Trigger Member
168. Top of Trigger Member
169. Spring
170. Pistol Grip
171. Base of Pistol Grip
172. Rheostat
174. 120 VAC Power Cord to rheostat 172
175. 120 VAC Power Cord to momentary contact switch 166
176. 120 VAC Power Cord to heater element 156
177. Grommet
178. Compression Spring

We claim:

1. A pest control device for insects and similar pests, comprising:
   a means for generating a variable suction of air;
   a hand-held intake means in fluid communication with said means for generating a variable suction, for strategically locating the suction by hand movement to collect pests wherein said hand-held intake means includes a hand-held intake and collection unit with a suction intake tube, a pistol grip and a pest counting/viewing chamber;
   a hand-actuated control means for said means for generating a variable suction, on said hand-held intake means and connected to said means for generating a variable suction, for varying the suction by-hand control; and
   an air filter means operatively connected to said means for generating a variable suction for filtering air from said intake means, to generate clean exhaust air from said intake means.

2. A pest control device of claim 1 in which the pest counting/viewing chamber includes a funnel, a clear tube affixed to the funnel and a screened diaphragm affixed to the tube, the hand-actuated control means includes a trigger attached to a pistol grip, the pest control device further comprising a cable connecting the trigger to the means for generating a variable suction and the pest control device further comprising a second cable connecting the trigger to the screened diaphragm, for moving the screened diaphragm and opening the counting/viewing chamber.

3. A pest control device as in claim 1, the pest counting/viewing chamber including a funnel, a clear tube affixed to the funnel, and a screened diaphragm affixed to the tube.

4. A pest control device as in claim 1, the hand-actuated control means including a trigger attached to the pistol grip.

5. A pest control device as in claim 4, further comprising a cable connecting the trigger to the means for generating a variable suction.

6. A pest control device as in claim 1, in which the means for generating a variable suction includes a housing and a vacuum motor in the housing.

7. A pest control device as in claim 6, the means for generating a variable suction including a variable vacuum bleeder valve operatively associated with the vacuum motor.

8. A pest control device of claim 7, the hand-actuated control means including a trigger attached to a pistol grip, the device further including a cable connecting the trigger to the variable vacuum bleeder valve for adjusting the valve and thereby varying the suction.

9. A pest control device for inserts and similar pests comprising:
   a means for generating a variable suction of air;
   a hand-held intake means in fluid communication with said means for generating a variable suction, for strategically locating the suction by hand movement to collect pests;
   a hand-actuated control means for said means for generating a variable suction, on said hand-held intake means and connected to said means for generating a variable suction, for varying the suction by hand control; and
   an air filter means for generating essentially allergen-free exhaust air from said means for generating a variable suction operatively connected to said means for generating a variable suction for filtering air from said intake means, wherein said air filter means includes means for removing from the air progressively and in order pests and debris, coarse particulate matter such as allergens, liquids and residual matter.

10. The pest control device of claim 9 in which the hand-held intake means includes a hand-held intake and collection unit with a suction intake tube and a pistol grip.

11. The pest control device as in claim 10, the hand-actuated control means including a trigger attached to a pistol grip.

12. The pest control device as in claim 9, further including a counting/viewing chamber that includes a funnel, a clear tube affixed to the funnel and a screened diaphragm affixed to the tube.

13. A pest control device as in claim 9, in which the means for progressively removing pests and debris, coarse particulate matter, liquids, and residual matter includes at least a coarse material filter, a moisture filter following the coarse material filter, and a HEPA filter following the moisture filter.

14. A pest control device as in claim 9, in which the means for progressively removing pests and debris, coarse particulate matter, liquids, and residual matter includes:
   a first filter chamber positioned after said intake means in communication therewith for the collection of pests and debris;
   a second filter chamber positioned after the first filter chamber and in communication therewith for collecting particulate matter such as allergens;
   a third filter chamber positioned after the second filter chamber and in communication therewith for absorbing liquids; and
   a fourth filter chamber positioned after the third filter chamber and in communication therewith for removal of remaining particulate matter in order to provide at least about 90% allergen-free exhaust air from said means for generating a variable suction.

15. A pest control device for insects and similar pests comprising:
   means for generating a variable suction of air,
   a hand-held intake means in fluid communication with said means for generating a variable suction, for locating the suction by hand movement to collect pests;
   a hand-actuated control means for said means for generating a variable suction, on said hand-held intake means and connected to said means for generating a variable suction, for varying the suction by hand control;

an air filter means operatively connected to said means for generating a variable suction for filtering air from said intake means, to generate clean exhaust air from said intake means, a heater means for heating air, a means in fluid communication with said heater means and said air filter means for directing the clean exhaust air of the intake means through said heater to generate heated, clean air; and a hand-held exhaust means in fluid communication with said means for directing the clean exhaust air, for locating said heated, clean air for chasing said pests from hiding places.

16. A pest control device as in claim 15, in which the hand-held exhaust means includes a hand-held heater and exhaust unit with an exhaust tube and a pistol grip.

17. A pest control device as in claim 16, further comprising:

a means for generating a variable flow of said exhaust air; and hand-actuated control means for said means for generating a variable flow of said exhaust air, on said hand-held heater and exhaust unit and connected to said means for generating a variable flow of said exhaust air, for varying the flow by hand control.

18. A pest control device as in claim 16, further comprising:

means on said hand-held heater and exhaust unit for controlling the temperature of the heated air.

19. A pest control device for insects and similar pests, comprising:

a means for generating a variable suction of air, including a housing, a vacuum motor in the housing, and a variable vacuum bleeder valve operatively associated with the vacuum motor;

a hand-held intake means in fluid communication with said means for generating a variable suction, including a hand-held intake and collection unit with a suction intake tube, a pistol grip, and a pest counting/viewing chamber, for strategically locating the suction by hand movement to collect pests, the pest counting/viewing chamber including a funnel, a clear tube affixed to the funnel, and a screened diaphragm affixed to the tube;

a hand-actuated control means for said means for generating a variable suction, on said hand-held intake means and connected to said means for generating a variable suction, including a trigger attached to the pistol grip, the trigger being operatively connected to the variable vacuum bleeder valve for adjusting the valve and thereby generating a variable suction, for varying the suction by hand control, the trigger also being operatively connected to the screened diaphragm, for moving the screened diaphragm and opening the counting/viewing chamber, an air filter means operatively connected to said means for generating a variable suction for filtering air from said intake means, to generate clean exhaust air from said intake means, and including means for generating essentially allergen free exhaust air from said means for generating a variable suction, and further including means for removing from the air progressively in order pests and debris, coarse particulate matter such as allergens, liquids, and residual matter, with the following:

a first filter chamber positioned after said intake means in communication therewith for the collection of pests and debris;

a second filter chamber positioned after the first filter chamber and in communication therewith for collecting particulate matter such as allergens;

a third filter chamber positioned after the second filter chamber and in communication therewith for absorbing liquids; and a fourth filter chamber positioned after the third filter chamber and in communication therewith for removal of remaining particulate matter in order to provide at least about 90% allergen-free exhaust air from said means for generating a variable suction;

the device further comprising:

a heater means for heating air;

a means in fluid communication with said heater means and said air filter means, for directing the clean exhaust air of the intake means through said heater means to generate heated, clean air; and a hand-held exhaust means in fluid communication with said means for directing the clean exhaust air, including a hand-held heater and exhaust unit with an exhaust tube and a pistol grip, for strategically locating said heated, clean air for chasing said pests from hiding places;

a means for generating a variable flow of said exhaust air; and hand-actuated control means for said means for generating a variable flow of said exhaust air, on said hand-held heater and exhaust unit and connected to said means for generating a variable flow of said exhaust air, for varying the flow by hand control; and means on said hand-held heater and exhaust unit for controlling the temperature of the heated air.

20. A pest control device for insects and similar pests, comprising:

a vacuum assembly including a housing, a vacuum motor in the housing, and a variable vacuum bleeder valve operatively associated with the vacuum motor, to generate a variable suction of air;

a hand-held intake and collection unit with a suction intake tube, a pistol grip, and a pest counting/viewing chamber, to strategically locate the suction by hand movement to collect pests, the pest counting/viewing chamber including a funnel, a clear tube affixed to the funnel, and a screened diaphragm affixed to the tube;

a hand-actuated control, on said hand-held intake and collection unit and connected to said variable vacuum bleeder valve, including a trigger attached to the pistol grip, the trigger being operatively connected to the variable vacuum bleeder valve for adjusting the valve and thereby generating a variable suction, to vary the suction by hand control, the trigger also being operatively connected to the screened diaphragm, to move the screened diaphragm and open the counting/viewing chamber;

an air filter assembly operatively connected to said hand-held intake and collection unit and to said vacuum assembly for filtering air, to generate essentially allergen free clean exhaust air from said intake and collection unit, and further including filters to remove from the air progressively and in order pest and debris, coarse particulate matter such as allergens, liquids, and residual matter, as follows;

a first filter chamber positioned after said intake and collection unit in communication therewith to collect pests and debris;

a second filter chamber positioned after the first filter chamber and in communication therewith to collect particulate matter such as allergens;

a third filter chamber positioned after the second filter chamber and in communication therewith to absorb liquids, and a fourth filter chamber positioned after the third filter chamber and in communication therewith to remove remaining particulate matter in order to provide at least about 90% allergen-free exhaust air;

a diverter in fluid communication with said air filter assembly to divert exhaust air;

a second bleeder valve operatively associated with the diverter and filter assembly;

a hand-held heater and exhaust unit in fluid communication with said diverter, to direct the clean exhaust air, including an exhaust tube, a pistol grip, and a heater to heat air, to strategically locate heated, clean air to chase said pests from hiding places;

a hand-actuated control of said second bleeder valve to generate a variable flow of said exhaust air, on said hand-held heater and exhaust unit and connected to said second bleeder valve, to vary the flow by hand control; and a control on said hand-held heater and exhaust unit for controlling the temperature of the heated air.

* * * * *

UNITED STATES PATENT AND TRADEMARK OFFICE
CERTIFICATE OF CORRECTION

PATENT NO. : 5,806,238
DATED : 9/15/98
INVENTOR(S) : Richard J. Brenner, David E. Milne and Stoy A. Hedges It is certified that error appears in the above-identified patent and that said Letters Patent is hereby corrected as shown below:

Assignee should include "The Terminix International Company L.P.
860 Ridge Lake Boulevard
Memphis, TN  38120"

Signed and Sealed this

Twenty-fifth Day of January, 2000

Attest:

Attesting Officer

*Acting Commissioner of Patents and Trademarks*